United States Patent [19]

Sorensen

[11] 4,141,572

[45] Feb. 27, 1979

[54] VEHICLE LEVELING STRUT

[75] Inventor: Ronald L. Sorensen, Monroe, Mich.

[73] Assignee: Monroe Auto Equipment Company, Monroe, Mich.

[21] Appl. No.: 816,454

[22] Filed: Jul. 18, 1977

[51] Int. Cl.² ............................................. B60G 17/00
[52] U.S. Cl. .................................. 280/707; 267/65 D
[58] Field of Search ............ 267/8 R, 65 D; 280/6 R, 280/6 H, 6.1, 6.11, 704, 707

[56] References Cited

U.S. PATENT DOCUMENTS

| 3,246,905 | 4/1966 | Morgan | 280/6 |
| 4,017,099 | 4/1977 | Hegel et al. | 267/65 D X |
| 4,054,295 | 10/1977 | Elliott | 280/707 X |

Primary Examiner—Duane A. Reger
Attorney, Agent, or Firm—Harness, Dickey & Pierce

[57] ABSTRACT

A vehicle leveling strut of the type comprising a direct-acting hydraulic shock absorber provided with a reciprocable piston rod having a dirt shield mounted thereon, a tubular rolling diaphragm member secured at one end to the shock absorber and at the opposite end to the dirt shield and defining therewith a variable volume chamber adapted to be selectively pressurized and depressurized for controlling the distance between the sprung and unsprung portions of an associated vehicle; located interiorly of the pressurizable chamber and fixedly mounted to one wall thereof is a support member which is fabricated of a relatively flexible or compliant material which is provided with solid state electronic sensing means for sensing the relative axial displacement between the shock absorber dirt shield and reserve tube and provide a control signal which is communicated via a connector assembly secured to the support member to an electrical conductor, to effect energization of a suitable source of pressurized fluid.

34 Claims, 7 Drawing Figures

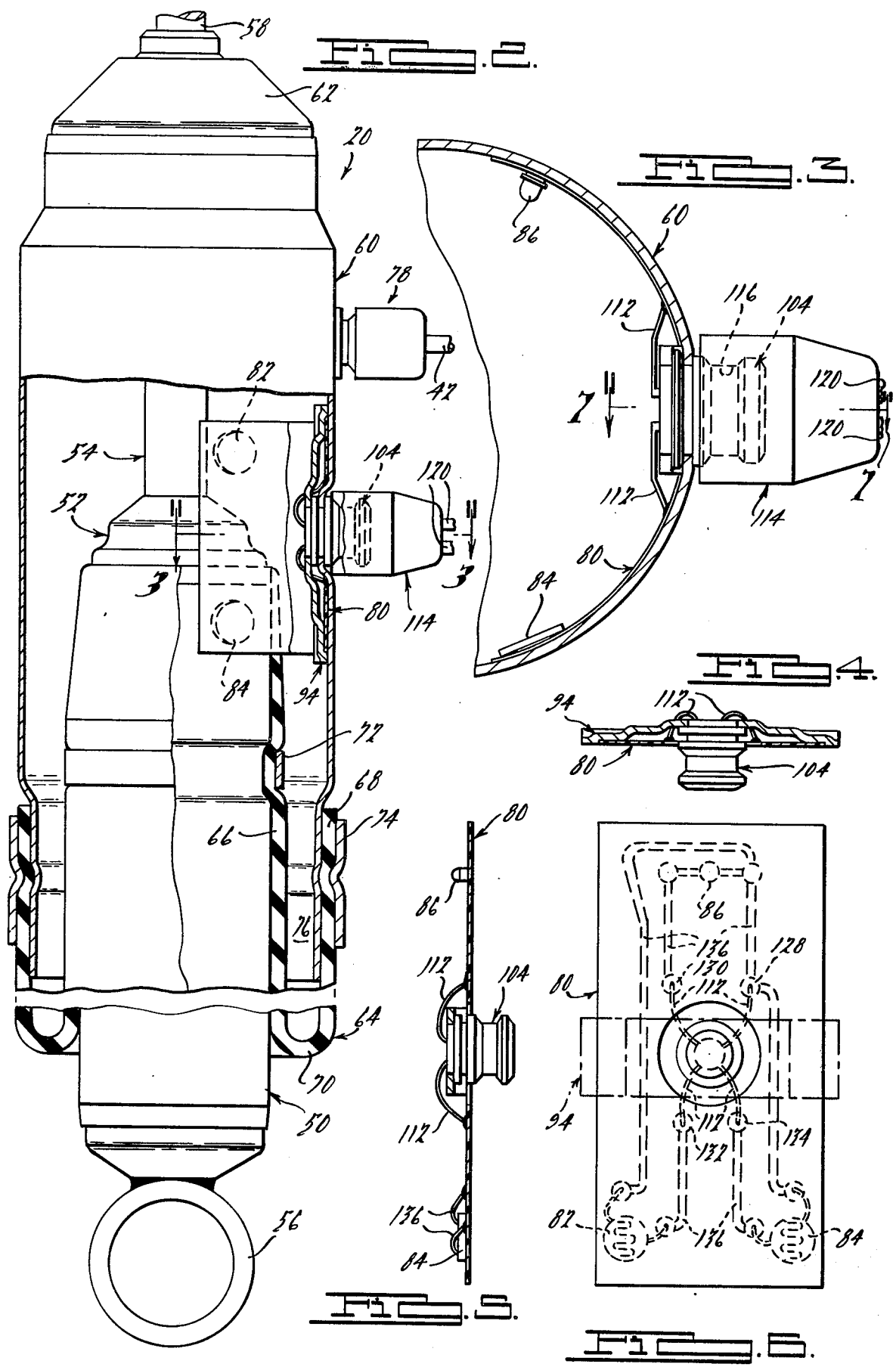

VEHICLE LEVELING STRUT

SUMMARY OF THE INVENTION

The present invention relates generally to vehicle leveling systems of the type shown in U.S. patent application Ser. No. 585,322, filed June 9, 1975, now U.S. Pat. No. 4,017,099. More particularly, the present invention relates to a new and improved vehicle leveling strut that is intended to be incorporated in leveling systems shown in said patent.

As described in U.S. Pat. No. 4,017,099, it has been the practice to utilize an external height detecting controller located remote from vehicle suspension struts of vehicle leveling systems which generally function to vary the attitude or spacing between the ground engaging axle of a vehicle and the vehicle's chassis, with the height detecting controller sensing sustained changes in the height relationship between the axle and chassis and controlling fluid flow between a suitable source of pressurized fluid and the suspension struts. Such remotely located controllers have been found to be objectionable because they necessitate separate factory installation and the fact that they require accurate positioning and adjustment in order to assure the desired overall operation of the leveling system. While integrated controllers and suspension struts have been proposed in the U.S. Pat. Nos. 3,584,894 and 3,606,375, such devices have been found to be objectionable due to the fact that they were located externally of the suspension struts and thus were subject to the hostile environment that exists in connection with modern automotive vehicles. Aforementioned U.S. Pat. No. 4,017,099 discloses an arrangement by which the height controlling elements are located interiorly of the pressurizing chamber and the present invention relates to a refinement of the principles set forth in said patent by which the height sensing elements and their associated electronic circuitry may be conveniently mounted directly upon one peripheral wall portion of the pressurizing chamber of the associated leveling strut. This assemblage is preferably combined with a connector arrangement which is intended to be communicable via a suitable opening or aperture in the suspension strut dirt shield with suitable electrical conductors connected to the associated control system and pressurizing source. By virtue of the fact that the aforesaid circuitry and height sensing elements are prelocated relative to one another prior to installation, correct operating orientation of these elements is assured so that no subsequent adjustment of their relative positions thereof is necessary. Moreover, by virtue of the fact that the assemblage may be supported within the pressurizing chamber upon a support member having a portion of the associated electrical circuitry also mounted thereon, the height sensors, as well as the associated circuitry, is protected from the hostile exterior environment. Consequently, assembly time is minimized to the extreme and adjustment or positioning of the respective height sensing elements is entirely obviated.

It is to be noted that the terms "height," "distance," "altitude," etc. and derivatives thereof, are used interchangeable herein, as well as throughout the automotive arts, as referring to the magnitude of spacing between a vehicle's sprung and unsprung portions, for example, between a vehicle frame and its associated axles. It is also to be noted that the term "associated electronic circuitry" used herein is intended to mean wires, conductors (either discrete wires or printed circuits), as well as electronic components per se, (either solid state or otherwise) or any combination thereof.

It is accordingly a general object of the present invention to provide a new and improved vehicle leveling system wherein the height sensing and controlling elements, as well as a portion of the associated electronic circuitry, is mounted directly within the suspension strut(s).

It is a more particular object of the present invention to provide a new and improved combined height sensing and controlling mechanism for an auxiliary suspension component wherein the height sensing elements and a portion of the associated circuitry are mounted directly upon the interior peripheral wall of the pressurizable chamber.

It is yet another object of the present invention to provide a method of installing the aforesaid height sensing and controlling elements by first orienting such elements on a mounting member and thereafter positioning such a member within the pressurizing chamber so as to assure that the height sensing and controlling elements are located or oriented in a predetermined manner.

It is another object of the present invention to provide a new and improved leveling system of the above-described type wherein the mounting member for the height sensing and controlling elements is operatively combined with a connector assembly which is adapted to extend through an opening in the wall of the suspension strut, which connector assembly is designed so as to provide a fluid-tight seal around the periphery of the said aperture.

It is yet another object of the present invention to provide a new and improved leveling system, as above described, wherein in addition to the height sensors, at least a portion of the electronic circuitry for the height sensing and controlling elements may be mounted directly upon the support member therefor.

It is still a further object of the present invention to provide a new and improved leveling system, as set forth above, which is of a relatively simple design, is economical to manufacture and will have a long and effective operational life.

Other objects and advantages of the present invention will become apparent from the following detailed description taken in conjunction with the accompanying drawings.

BRIEF DESCRIPTION OF THE DRAWINGS

FIG. 2 is an enlarged side elevational view, partially broken away, of one of the suspension struts incorporated in the leveling system shown in FIG. 1;

FIG. 3 is an enlarged fragmentary cross-sectional view taken substantially along the line 3—3 of FIG. 2;

FIG. 4 is a bottom elevational view of the combination support member and connector assembly incorporated in the present invention;

FIG. 5 is a side elevational view of the structure shown in FIG. 4;

FIG. 6 is a front elevational view of the structure shown in FIGS. 4 and 5; and

Other objects and advantages of the present invention will become apparent from the following detailed description, taken in conjunction with the accompanying drawings.

DETAILED DESCRIPTION OF A PREFERRED EMBODIMENT

Figure 1:
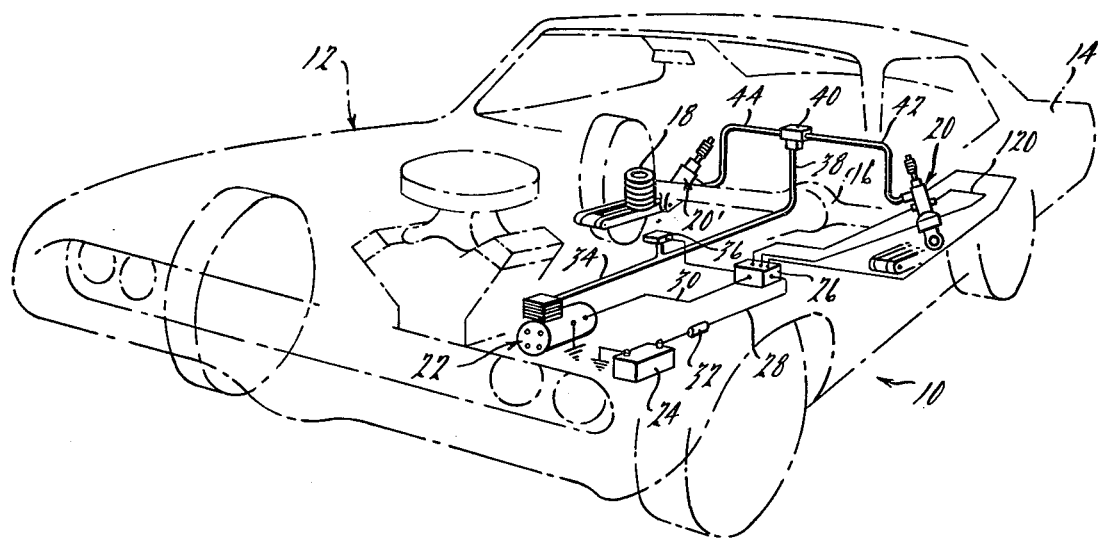
FIG. 1 is a schematic representation of an automotive vehicle having the leveling system of the present invention embodied therein.

Referring now in detail to the drawings, and in particular to FIG. 1 thereof, a vehicle leveling system 10, in accordance with one preferred embodiment of the present invention, is shown in operative association with a typical automotive vehicle, representatively designated by the numeral 12. The vehicle 12 is shown as comprising a sprung portion or chassis 14 and an unsprung or axle portion 16, between which main or primary suspension springs 18 are located. Generally speaking, the leveling system 10 comprises a pair of auxiliary suspension components or struts 20 and 20' which are adapted to be selectively pressurized and de-pressurized, for example, from a suitable source of fluid pressure such as an electrically energized air compressor 22. The compressor 22 is supplied with electrical energy from a conventional 12-volt vehicle battery 24 which is communicable with an electrical control module 26 via an electrical conductor 28. The module 26 is in turn connected to the compressor 22 via a suitable conductor 30, and a suitable safety fuse 32 may be provided in the electrical circuit connecting the battery 24 with the compressor 22. The compressor 22 is adapted to supply pressurized air via a conduit 34 to a control valve mechanism 36 and via a conduit 38, T-fitting 40 and conduits 42 and 44 to the suspension struts 20 and 20'. Briefly, in operation of a leveling system 10, at such time as the vehicle 12 becomes loaded to a predetermined magnitude, the control module 26 will effect energization of the compressor 22 to increase the pressure in the conduits 38, 42, 44 and the struts 20, 20' connected thereto, thereby causing extension thereof so as to raise the sprung portion 14 of the vehicle 12 to a level or other predetermined attitude. At such time as the vehicle 12 is unloaded, the control module 26 will effect actuation of the control valve 36 such that the components 20, 20' will be vented to atmosphere (or elsewhere), whereby the struts 20, 20' will be compressed or contracted, resulting in the sprung portion 14 of the vehicle 12 being lowered to some predetermined attitude.

Referring now in detail to the construction and operation of the auxiliary suspension component 20, as best seen in FIG. 2, the component 20 comprises, by way of example, a direct-acting hydraulic shock absorber 50 having a hydraulic cylinder or housing 52. Extending upwardly from the cylinder 52 is a reciprocable piston rod 54 which is connected at a lower end to a reciprocable piston (not shown) that is reciprocable within the cylinder 52 to dampen relative movement between the sprung and unsprung portions of the vehicle 12. The lower end of the cylinder 52 is provided with a lower end fitting 56 which is adapted to be secured in a conventional manner to the unsprung portion 16 of the vehicle 12, while the upper end of the piston rod 54 is provided with an upper end fitting 58 adapted to be secured in a conventional manner to the sprung portion of the vehicle 12. Mounted on and reciprocable with the piston rod 54 is an annular or tubular dirt or dust shield member 60 which extends coaxially of the piston rod 54 and is spaced radially outwardly from the outer periphery of the cylinder 52. The upper end of the dirt shield 60 is provided with a generally inverted cup-shaped end cap 62 that is secured to the piston rod 54 and closes off the upper end of the dirt shield 60. Disposed between the lower end of the dirt shield and the cylinder 52 is a rolling flexible diaphragm member, generally designated by the numeral 64. The member 64 is fabricated of a suitable material, such as fabric reinforced rubber, and comprises an inner end portion 66 that is sleeved over the outer periphery of the cylinder 52. The diaphragm member 64 also comprises an outer end portion 68 that is sleeved over the lower end of the dirt shield 60, with the inner and outer portions 66, 68 being connected by a reversely folded lower portion 70, as illustrated in FIG. 2. The end portions 66, 68 are secured to the cylinder 52 and dirt shield 60, respectively, by suitable clamping rings or the like 72, 74, whereby the dirt shield 60 and diaphragm 64 define a pressurizable chamber 76 which is adapted to be selectively pressurized by fluid, i.e., compressed air or the like, supplied from the compressor 22. A suitable attachment fitting 78 is provided on the dirt shield 60 for securing the adjacent end of the conduit 42 thereto, as will be apparent to those skilled in the art. The attachment fitting 78 may be of any suitable construction but is preferably of the type shown in U.S. Pat. No. 3,692,296, issued Sept. 19, 1972, which is owned by the assignee hereof.

In accordance with the principles of the present invention, disposed internally of the chamber 72 and secured to the interior side of the dirt shield 60 is a generally flat or planar support member 80 which is fabricated of a relatively flexible or compliant polymeric material, such as a suitable polyester resin and is of a shape suitable for supporting and locating the below described components 82, 84 and 86. The member 80 is preferably secured to the wall of the dirt shield 60 by a suitable adhesive material, for example, by a suitable contact-type adhesive or the like. As best seen in FIG. 3, the length of the member 80 is preferably about one-half of the circumference of the interior of the dirt shield 60, and the width of the member is approximately one-half of the length thereof. Mounted at one end of the member 80 is a pair of light sensitive devices, 82 and 84 which preferably comprise a pair of photoresistors, but which may satisfactorily consist of phototransistors or similar solid state electronic components that are adapted to produce electrical signals in response to their exposure to a light source, such as is indicated at 86. The light source 86 preferably comprises a light emitting diode (L.E.D.) and is mounted on the same side of the support member as the devices 82, 84, but at the opposite end thereof. The elements 82–86, in accordance with the present invention, are arranged or oriented upon the member 80 in a manner such that when the member 80 is secured to the inner walls of the dirt shield 60 in the manner shown in FIG. 3 (turned approximately 90° from the position shown in FIG. 6), these components will be properly located relative to the upper end of the cylinder 52 so that the strut 20 will operate in the same manner as is described in the aforementioned U.S. Pat. No. 4,017,099. In particular, when the member 80 is turned 90° from the position shown in FIG. 6 to the operative position shown in FIGS. 2 and 3, the photoresistor 82 will be located above photoresistor 84 and both photoresistors 82, 84 will be on substantially the opposite side of the chamber 76 from the L.E.D. 86. The photoresistor 82 and light source 86 operate such that when the upper end of the cylinder 52 blocks the transmission of light from the light source 86 to the lower photoresistor 84 and permits light to be transmitted to the upper photoresistor 82, the solenoid valve 36 remains closed to the atmosphere and the compressor 22 remains deenergized. At such time as the vehicle 12 becomes loaded to a predetermined magnitude, resulting in the dirt shield 60 moving downwardly relative to the shock absorber 50, the upper end of the cylinder 52 will block the transmission of light from the light source 86 to the upper photoresistor 82, as well as to the lower photoresistor 84. Under these conditions, the solenoid valve 36 will remain normally closed and the compressor 22 will be energized, whereby increased pressurization of the suspension components 20, 20' will occur to effect raising the sprung portion 14 of the vehicle 12. When the load on the vehicle 12 is removed, the primary suspension springs 18 will cause the sprung portion 14 thereof to be raised, whereupon the upper end of the cylinder 52 will be displaced axially relative to the dirt shield 60, thereby causing light from the light source 86 to be transmitted to the lower photoresistor 84, whereupon the solenoid valve 36 will exhaust the conduit 38 to atmosphere to permit lowering of the sprung portion 14 of the vehicle 12. It will be noted that the vertical spacing between the photoresistors 82, 84 may be varied in accordance with the desired axial movement between the dirt shield 60 and the upper end of the cylinder 52, and that a suitable time delay feature, as described in the aforementioned U.S. Pat. No. 4,017,099 may be incorporated in the electric circuitry of of the leveling system to prevent premature energization of the compressor 22 or valve 36.

Figure 7:
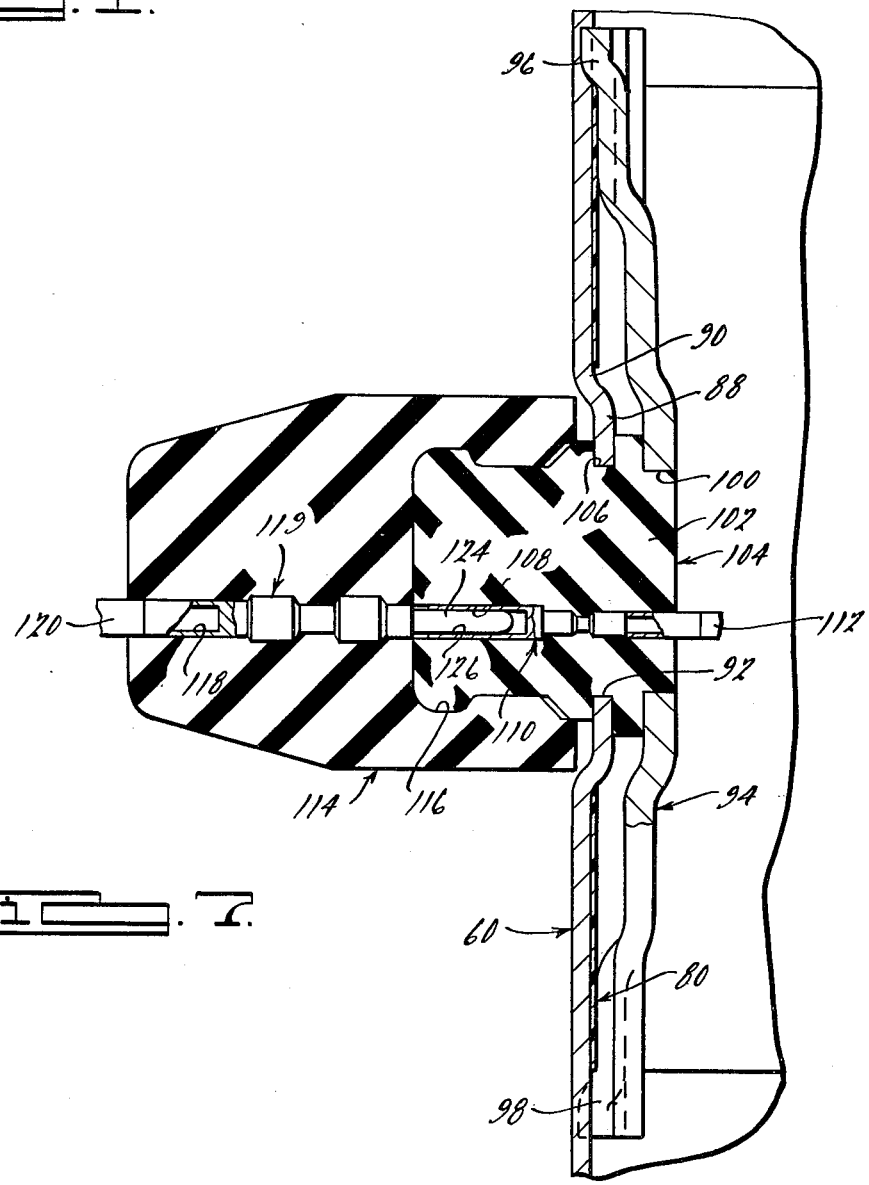
FIG. 7 is an enlarged fragmentary cross-sectional view taken substantially along the line 7—7 of FIG. 3.

Referring now in detail to the manner in which the support member 80 is operatively mounted within the dirt shield 60 and in particular, to FIG. 7, it will be seen that the wall of the dirt shield 60 is provided with a radially inwardly projecting boss or a shoulder 88 that is adapted to be received within a central opening 90 in the support member 80, whereby to axially position the member 80 within the dirt shield 60. The shoulder 88 is formed with an opening 92 through which suitable electrical conductor means are provided for operatively connecting the components 82, 84 and 86 to the control module 26, as will later be described. Disposed interiorly of the support member 80 is a retainer plate 94 which is provided with a pair of opposed leg sections 96, 98 that engage the wall of the dirt shield 60 at positions above and below the member 80, as best seen in FIG. 7. The leg sections 96, 98 may, if desired, be secured to the wall of the dirt shield 60, as by spot welding. The retainer plate 94 is formed with a central opening 100 which is coaxially aligned with the opening 92 and adapted to nestingly receive the inner end portion 102 of a male connector member 104. The member 104 is preferably fabricated of a resilient deformable grommet-like material, such as rubber or a suitable plastic material, and is formed with an annular peripheral recess 106 within which the peripheral edge of the opening 92 is received in fluid-tight engagement. The connector member 104 is formed with a plurality of outwardly extending bores, generally designated 108, within each of which is located a terminal socket member 110. The inner end of each of the socket members 110 is adapted to be connected via a conductor 112 with the electrical circuitry carried on the support member 80 (hereinafter to be described), while the outer end of each of the socket members 110 is cooperable with one of a plurality of terminal elements 119 (later to be described) that are carried on a female connector member, generally designated 114. The member 114 is also preferably fabricated of a suitable resilient deformable material, such as rubber or a suitable plastic material, and is formed with a cavity 116 at one end thereof which is complementary in shape with the outer end of the connector member 104 and is adapted to have the outer end of the member 104 nestingly received therein in the manner best seen in FIG. 7. The connector member 114 is also formed with a plurality of outwardly projecting bores 118 which are intended to be aligned with bores 108 upon assembly of the members 104, 114. Disposed within each of the bores 118 is one of the aforementioned terminal elements 119 that is adapted to be connected in a suitable manner to a conductor 120 which is in turn communicable with the control module 26. Each of the elements 119 has an inwardly projecting portion 124 adapted to be telescopically or nestingly received within a suitable blind bore 126 in the associated terminal socket 110 in the manner shown in FIG. 7 upon assembly of the member 114 onto the member 104, thereby completing electrical communication between the conductors 112 and 120. It is to be noted that the number of conductors 112, 120 and engageable sockets 110 and elements 119 may vary depending upon the electric circuitry associated with the subject leveling system. In the illustrated embodiment, four such sets of engageable sockets are utilized, with the result that four conductors 112 are shown as being connected to a corresponding number of terminals 128, 130, 132 and 134 on the support member 80, as best seen in FIG. 6. It should be noted that if desired, direct connections can be made between the socket elements and the height sensors.

As will be appreciated by those skilled in the art, the connector members 104, 114 are intended to function in providing for electrical communication between the interior and exterior of the chamber 76 in a fluid-tight manner and consequently, the design of the components 104, 106 is such as to assure against fluid leakage and thus, possible depressurization of the chamber 76. Toward this end, one of the important features of the retainer plate 94 is to apply a pre-load force to the connector member 104 to assure that the same is maintained in fluid-tight engagement with the wall of the dirt shield 60 circumjacent the opening 92.

As previously mentioned, one of the purposes of the support member 80 other than operatively supporting and positioning the photoresistors 82, 84 and light source 86 is to carry a portion of the electronic circuitry associated with these components. Such circuity, in accordance with the present invention, may be either in the form of discrete electrical conductors or, alternatively, be in the form of what is known in the art as a printed circuit which may be provided directly on the support member 80. In addition, other circuit elements (components) may be located on the member 80, such as solid state electronic components and the like. Since the present invention is intended to encompass both types of circuitry, representatively designated by the numeral 136 in FIG. 6, it is intended that the schematic representation of such circuitry be considered generic to both printed circuits and electric circuitry consisting of separate electrical conductors and/or a combination of each.

It is also to be noted that while the support member 80 is shown as being fabricated of a thin sheet of a plastic material, such as Mylar, and be separated from the associated connector member 104, the scope of the present invention is not intended to be so limited, since the members 104, 80 could be fabricated integrally of one another. (Note that Mylar is a registered trademark of E. I. duPont de Nemours & Co., Inc.) Also, the retainer plate 94 could be eliminated without departing from the scope of the present invention provided the members 80 and/or 104 were properly designed so as to assure against fluid leakage around the periphery of the opening 92.

It will be seen from the foregoing that the present invention provides a unique leveling system wherein the height controlling elements thereof are located interiorly of the leveling struts so as to be entirely protected from the environment. More importantly, the present invention provides an arrangement by which the height controlling elements may be conveniently supported within the associated leveling chamber (dirt shield 60) and be pre-arranged at the time of assembly so as to require no subsequent adjustment of their respective operative locations. Accordingly, extremely uniform and reliable production will be achieved and quality control will be maintained to the extreme. Of course, another related feature of the present invention resides in the fact that the support member, as well as the electronic components mounted thereon, may be assembled into the associated leveling strut with extreme ease so as to not require any significant additional assembly time over that which is required for a conventional leveling strut per se. Finally, because of the extreme simplicity of the design, the present invention will enjoy a long and effective operational life and may be manufactured at significant economies, such as compared to the various prior art height adjuster mechanisms referred to above.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:
1. A telescopically adjustable assembly,
   including a first member defining a chamber,
   a second member telescopically movable within said chamber,
   a source of pressurized fluid for moving said members relative to one another,
   a control circuit including position sensing means for effecting actuation of said source in response to relative displacement of said members, and
   means for supporting said position sensing means on an interior wall portion of said chamber and for orienting said sensing means at a predetermined location relative to one of said members.
2. The invention as set forth in claim 1 wherein said telescopically adjustable assembly comprises an air adjustable shock absorber unit.
3. The invention as set forth in claim 1 wherein said position sensing means comprises a solid state electronic element.
4. The invention as set forth in claim 1 which includes means extending through an opening in a wall of said chamber and connectable to an electrical conductor located exteriorly of said assembly.
5. The invention as set forth in claim 1 wherein said last mentioned means comprises a relatively flexible support member adapted to conform to and be secured to a wall of said chamber.
6. The invention as set forth in claim 5 wherein said position sensing means comprises a light source and at least one light responsive element mounted on said flexible member.
7. The invention as set forth in claim 6 which includes a pair of spaced apart light sensitive elements secured to said member.
8. The invention as set forth in claim 5 wherein said member is secured to said wall of said chamber by adhesive means disposed interjacent said member and said wall.
9. The invention as set forth in claim 2 wherein said air adjustable shock absorber unit comprises a piston and cylinder assembly, a piston rod extending axially from one end of said cylinder, a generally tubular dirt shield mounted on said piston rod and extending coaxially thereof and spaced radially outwardly from said cylinder, and a rolling diaphragm member secured to said cylinder and said dirt shield and defining said chamber therewith.
10. The invention as set forth in claim 9 wherein the said means located interiorly of said chamber comprises a flexible compliant member secured to the interior of said dirt shield and wherein said position sensing means comprises a light source located at one position on said member and a pair of light sensing elements located at another portion of said member and oriented such that said cylinder is movable between said light source and said elements so as to act as a shutter controlling the light transmitted therebetween.
11. An air adjustable shock absorber comprising,
    a hydraulic direct acting shock absorber having a piston, cylinder and dirt shield,
    a piston rod attached to said piston and extending axially from one end of said cylinder,
    a generally tubular diaphragm member defining a pressurizable chamber with said dirt shield and said cylinder,
    means for supplying pressurized fluid to and from said chamber, and
    a relatively flexible member adapted to conform to the shape of and be mounted on an interior wall portion of said chamber for operatively supporting and pre-orienting position sensing elements that are operable in response to relative axial displacement between said dirt shield and cylinder for controlling operation of said pressurized fluid supply means.
12. The invention as set forth in claim 11 wherein said position sensing elements comprise at least one solid state electronic element.
13. The invention as set forth in claim 11 which includes means extending through an opening in a wall of said chamber and connectable to an electrical conductor located exteriorly of said assembly.
14. The invention as set forth in claim 11 wherein said position sensing means comprises a light source and at least one light responsive element mounted on said flexible member.
15. The invention as set forth in claim 15 which includes a pair of spaced apart light sensitive elements secured to said member.
16. The invention as set forth in claim 15 wherein said member is secured to said wall of a peripheral chamber by adhesive means disposed interjacent said member and said wall.
17. The invention as set forth in claim 11 wherein said air adjustable shock absorber unit comprises a piston and cylinder assembly, a piston rod extending axially from one end of said cylinder, a generally tubular dirt shield mounted on said piston rod and extending coaxially thereof and spaced radially outwardly from said cylinder, and a rolling diaphragm member secured to said cylinder and said dirt shield and defining said chamber therewith.

18. The invention as set forth in claim 16 wherein the said member mounted on said peripheral wall of said chamber comprises a flexible compliant member secured to the interior of said dirt shield and wherein said position sensing means comprises a light source located at one position on said member and a pair of light sensing elements located at another portion of said member and oriented such that said cylinder is movable between said light source and said elements so as to act as a shutter controlling the light transmitted therebetween.

19. An air adjustable shock absorber comprising,
   a hydraulic direct acting shock absorber having a piston and cylinder,
   a piston rod attached to said piston and extending axially from one end of said cylinder,
   a generally tubular diaphragm member in part defining a pressurizable chamber with said cylinder,
   means for supplying pressurized fluid to and from said chamber,
   a control circuit control energization of said pressurized fluid supply means,
   first and second control members disposed within said chamber and adapted to cooperate at preselected positions relative to one another in effecting operation of said control circuit, and
   means operatively supporting said members on one interior wall portion of said chamber and positioning said members at said preselected positions relative to one another.

20. The invention as set forth in claim 19 which includes position sensing means comprising a solid state electronic element.

21. The invention as set forth in claim 19 which includes means extending through an opening in a wall of said chamber and connectable to an electrical conductor located exteriorly of said assembly.

22. The invention as set forth in claim 19 wherein said last mentioned means comprises a relatively flexible support member adapted to conform to and be secured to a wall of said chamber.

23. The invention as set forth in claim 19 wherein said positioning sensing means comprises a light source and at least one light responsive element mounted on said flexible member.

24. The invention as set forth in claim 23 which includes a pair of spaced apart light sensitive elements secured to said member.

25. The invention as set forth in claim 22 wherein said member is secured to said wall of said chamber by adhesive means disposed interjacent said member and said wall.

26. The invention as set forth in claim 19 wherein said air adjustable shock absorber unit comprises a piston and cylinder assembly, a piston rod extending axially from one end of said cylinder, a generally tubular dirt shield mounted on said piston rod and extending coaxially thereof and spaced radially outwardly from said cylinder, and a rolling diaphragm member secured to said cylinder and said dirt shield and defining said chamber therewith.

27. The invention as set forth in claim 26 wherein the said means supporting said portion of said circuit comprises a flexible compliant member secured to the interior of said dirt shield and wherein said position sensing means comprises a light source located at one position on said member and a pair of light sensing elements located at another portion of said member and oriented such that said cylinder is movable between said light source and said elements so as to act as a shutter controlling the light transmitted therebetween.

28. A combination electrical connector and position sensing device for an air adjustable shock absorber of the type comprising a hydraulic direct acting shock absorber and a pressurizable chamber adapted to be supplied with pressurized fluid from a suitable source thereof,
   said connector and position sensing device comprising a relatively flexible support member,
   means for securing said support member to one wall of said chamber, and
   at least one solid state sensing element on said support member for sensing relative displacement between first and second portions of said chamber, and an air-tight connector member disposed adjacent an access opening in one wall of said chamber and having first terminal means exposed to the interior of said chamber and second terminal means accessible through said opening and by which said sensing element may be operatively connected to a portion of a control circuit located exteriorly of said chamber and which controls operation of said pressurized fluid source.

29. The invention as set forth in claim 28 wherein said position sensing means comprises a solid state electronic element.

30. The invention as set forth in claim 28 wherein said position sensing means comprises a light source and at least one light responsive element mounted on said flexible member.

31. The invention as set forth in claim 30 which includes a pair of spaced apart light sensitive elements secured to said member.

32. The invention as set forth in claim 28 wherein said member is secured to said wall of said chamber by adhesive means disposed interjacent said member and said wall.

33. The invention as set forth in claim 28 wherein said air adjustable shock absorber unit comprises a piston and cylinder assembly, a piston rod extending axially from one end of said cylinder, a generally tubular dirt shield mounted on said piston rod and extending coaxially thereof and spaced radially outwardly from said cylinder, and a rolling diaphragm member secured to said cylinder and said dirt shield and defining said chamber therewith.

34. The invention as set forth in claim 33 wherein the said support member comprises a flexible compliant member secured to the interior of said dirt shield and wherein said position sensing means comprises a light source located at one position on said member and a pair of light sensing elements located at another portion of said member and oriented such that said cylinder is movable between said light source and said elements so as to act as a shutter controlling the light transmitted therebetween.

* * * * *

UNITED STATES PATENT AND TRADEMARK OFFICE
CERTIFICATE OF CORRECTION

PATENT NO. : 4,141,572
DATED : February 27, 1979
INVENTOR(S) : Ronald L. Sorensen It is certified that error appears in the above–identified patent and that said Letters Patent are hereby corrected as shown below:

Column 8, line 60 (Claim 15), "15" should be --14--.

Signed and Sealed this

First Day of July 1980

[SEAL]

*Attest:*

SIDNEY A. DIAMOND

*Attesting Officer*   *Commissioner of Patents and Trademarks*